United States Patent [19]
Rempel et al.

[11] Patent Number: 5,210,151
[45] Date of Patent: May 11, 1993

[54] HYDROGENATION OF NITRILE RUBBER

[75] Inventors: Garry L. Rempel; Xiang-Yao Guo, both of Waterloo, Canada

[73] Assignee: Polysar Rubber Corporation, Sarnia, Canada

[21] Appl. No.: 939,179

[22] Filed: Sep. 2, 1992

[51] Int. Cl.⁵ ................................. C08F 8/04
[52] U.S. Cl. ........................ 525/338; 525/329.3; 525/339
[58] Field of Search ............... 525/338, 339

[56] References Cited

U.S. PATENT DOCUMENTS

| | | | |
|---|---|---|---|
| 3,700,637 | 10/1972 | Finch | 260/83.3 |
| 4,384,081 | 5/1983 | Kubo | 525/339 |
| 4,464,515 | 8/1984 | Rempel et al. | 525/338 |
| 4,503,196 | 3/1985 | Rempel et al. | 525/338 |
| 4,631,315 | 12/1986 | Buding et al. | 525/338 |
| 4,812,528 | 3/1989 | Rempel et al. | 525/338 |
| 4,816,525 | 3/1989 | Rempel et al. | 525/338 |
| 4,876,314 | 10/1989 | Hoxmeier et al. | 515/338 |
| 5,034,469 | 7/1991 | Buding et al. | 525/338 |
| 5,057,581 | 10/1991 | Rempel et al. | 525/338 |
| 5,075,388 | 12/1991 | Rempel | 525/338 |
| 5,164,457 | 11/1992 | Kubo et al. | 525/338 |

FOREIGN PATENT DOCUMENTS 1558491  1/1980  United Kingdom.

Primary Examiner—Bernard Lipman
Attorney, Agent, or Firm—Joseph C. Gil; Godfried R. Akorli

[57] ABSTRACT

An improved process is provided for the catalytic hydrogenation of nitrile rubber using a ruthenium catalyst wherein the improvement is that the nitrile rubber is provided as an aqueous emulsion and a solvent and a selected inorganic additive are present during the hydrogenation, whereby the molecular weight increase in the hydrogenation process is minimized and controlled.

9 Claims, No Drawings

HYDROGENATION OF NITRILE RUBBER

FIELD OF THE INVENTION

The present invention relates to an improved process for the production of hydrogenated nitrile rubber.

BACKGROUND OF THE INVENTION

It is well known that the carbon-carbon double bonds in a nitrile rubber, the nitrile rubber being a polymer comprising a $C_4$-$C_6$ conjugated diolefin and a $C_3$-$C_5$ unsaturated nitrile, can be selectively hydrogenated, without significant hydrogenation of the C≡N bonds, by treatment of the polymer with hydrogen in the presence of selected catalysts — for example, British Patent 558,491; U.S. Pat. Nos. 3,700,637; 4,384,081; 4,464,515; and 4,503,196. The use of ruthenium catalysts for the hydrogenation of nitrile rubbers is described in U.S. Pat. Nos. 4,631,315; 4,816,525, 4,812,528, and 5,057,581. The use of certain additives useful in the ruthenium catalysed hydrogenation of nitrile rubbers is described in U.S. Pat. No. 5,075,388.

In the hydrogenation of nitrile rubbers, it has been found that, depending on the nature of the catalyst, the solvent used in the hydrogenation process and the reaction conditions used for the hydrogenation, the molecular weight of the hydrogenated nitrile rubber increases during the hydrogenation process. The molecular weight increase is believed to be due to an interaction between two or more polymer molecules. The molecular weight increase is particularly noticeable when certain of the ruthenium catalysts are used and the interaction between polymer molecules can be such that the hydrogenated polymer contains gelled (crosslinked) or insoluble polymer. Although a slight increase in molecular weight can be tolerated, if the molecular weight of the hydrogenated polymer is too high this causes it to be of low acceptability to the purchaser who uses it to manufacture products, such as hoses, gaskets, belts, etc.

Accordingly, the present invention is directed to an improved process for the hydrogenation of nitriletype polymers wherein the molecular weight increase in the hydrogenation process is minimized and controlled.

SUMMARY OF THE INVENTION

The present invention provides an improved process for the production of hydrogenated nitrile rubber wherein a nitrile rubber which is a polymer comprising a conjugated $C_4$-$C_6$ diolefin and a $C_3$-$C_5$ unsaturated nitrile is hydrogenated in the presence of a divalent ruthenium catalyst selected from compounds of the general formula:

wherein X is selected from a halogen atom or a carboxylate group, Y is selected from a halogen atom, a hydrogen atom, a phenyl group, a carboxylate group or a styryl group, Z is selected from CO, pyridine, benzonitrile or no ligand and L is selected from the phosphine ligands of the general formula $PR_3$ in which R is selected from alicyclic or alkyl groups, n is 2 or 3 and when n is 3 D is a halogen atom and E is a hydrogen atom and when n is 2 D is selected from a halogen atom or a carboxylate group and E is selected from a halogen atom, a hydrogen atom, a phenyl group or a carboxylate group, and M is selected from the phosphine ligands of the formula $PA_3$ in which A is a phenyl group or a $C_1$ to $C_4$ alkyl group or mixtures thereof, G is selected from a halogen atom or a hydrogen atom, J is selected from a halogen atom or a carboxylate group, K is a carboxylate group and N is a triphenylphosphine, the improvement being that said nitrile rubber is provided in an aqueous emulsion, an organic compound which is miscible with the aqueous phase and is also a solvent for the polymer and for the catalyst is added to said aqueous emulsion and an inorganic additive selected from ferrous sulphate, ammonium sulphate, ferrous ammonium sulphate, nickel sulphate, cobalt sulphate, ammonium chloride, sulphuric acid, hydrochloric acid and phosphoric acid is added to the mixture before hydrogenation is initiated, the weight of said additive per 0.01 parts by weight of ruthenium in the catalyst being from about 0.5 to about 1.5.

DETAILED DESCRIPTION

The nitrile rubber hydrogenated in this invention is a polymer comprising a conjugated $C_4$-$C_6$ diolefin and a $C_3$-$C_5$ unsaturated nitrile. The conjugated $C_4$-$C_6$ diolefin is selected from butadiene, isoprene, piperylene and 2,3-dimethyl butadiene, with butadiene and isoprene being preferred and butadiene being most preferred. The conjugated diolefin forms from about 50 to about 85 per cent by weight of the polymer. The $C_3$-$C_5$ unsaturated nitrile is selected from acrylonitrile, methacrylonitrile and ethacrylonitrile, with acrylonitrile being most preferred, and forms from about 15 to about 50 per cent by weight of polymer. The polymer may also contain a small amount, that is from about 1 to about 10 per cent by weight of the polymer, of an unsaturated carboxylic acid selected from fumaric acid, maleic acid, acrylic acid and methacrylic acid which replaces part of the conjugated diolefin and the conjugated diolefin forms from about 40 to about 84 per cent by weight of the polymer. The nitrile rubber has a molecular weight, as expressed by the Mooney viscosity (ML 1+4 at 100° C.), of from about 25 to about 70. A preferred nitrile rubber is a butadiene-acrylonitrile polymer having an acrylonitrile content of from about 25 to about 45 per cent by weight and having a Mooney viscosity (ML 1+4 at 100° C.) of from about 25 to about 60.

Nitrile rubber is usually prepared by aqueous emulsion free radical polymerization of the monomers, the direct product of the polymerization being an aqueous emulsion of nitrile rubber. This emulsion generally contains from about 15 to about 45 weight per cent of nitrile rubber. The nitrile rubber aqueous emulsion used in this invention thus contains from about 15 to about 45, preferably from about 28 to about 38, weight per cent of nitrile rubber, the balance being water, emulsifiers and minor proportions of other materials used in the polymerization.

The organic compound used in the invention is one which is miscible with the aqueous phase and which is also a solvent for the polymer and for the catalyst. Suitable such compounds include acetone, methylethylketone, tetrahydrofuran, methyl-tetrahydrofuran, cyclohexanone and the like; methylethylketone, acetone and tetrahydrofuran are preferred. The amount of such compound that is added to the nitrile rubber emulsion is from about 30 to about 5, preferably from about 15 to about 7, parts by weight per 1 part by weight of nitrile rubber in the emulsion.

Hydrogen is provided as essentially pure dry gas at a pressure of from about 25 kg/cm² (355 psi) to about 100 kg/cm² (1420 psi).

The hydrogenation reaction is undertaken in a suitable reaction vessel equipped with a temperature regulating means and an agitator. The nitrile rubber emulsion and the organic compound are added to the reaction vessel, the inorganic additive is added, any necessary degassing is undertaken, and either the catalyst is added followed by pressurizing with hydrogen or the vessel is pressurized with hydrogen and the catalyst is added. The catalyst may be added as the solid material or as a solution in an appropriate solvent. The exact order of addition is not critical. The reactor is heated to the desired temperature. The temperature for the hydrogenation is from about 80° to about 200° C., preferably from about 120° C. to about 180° C. Hydrogen may be added to the reactor during the hydrogenation and the reaction is complete within about 1 to about 24 hours, although when the preferred catalysts are used the reaction time is generally from about 2 to about 8 hours. The degree of hydrogenation may be controlled by control of one or more of the reaction time, temperature or hydrogen pressure, preferably reaction time. On completion of the reaction, the reaction vessel is vented and the polymer recovered by contact with hot water/steam or an alcohol followed by drying.

The divalent ruthenium catalyst used in the process is selected from compounds of the general formula

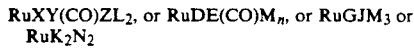

RuXY(CO)ZL₂, or RuDE(CO)M$_n$, or RuGJM₃ or RuK₂N₂ wherein X is selected from a halogen atom or a carboxylate group, preferably is a halogen atom and most preferably is chlorine; Y is selected from a halogen atom, a hydrogen atom, a phenyl group, a carboxylate group or a styryl group, preferably is a chlorine atom or a hydrogen atom and most preferably is a hydrogen atom; Z is selected from CO, pyridine, benzonitrile or no ligand; L is selected from phosphine ligands of the general formula PR₃ wherein R is selected from alicyclic or alkyl groups. For R, a preferred alicyclic group is cyclohexyl and the alkyl group is preferably selected from isopropyl and secondary butyl and from tertiary butyl when combined with smaller alkyl groups. Preferably R is cyclohexyl. n is 2 or 3 and when n is 3 D is a halogen atom and E is a hydrogen atom and when n is 2 D is selected from a halogen atom or a carboxylate group, E is selected from a halogen atom, a hydrogen atom, a phenyl group or a carboxylate group, preferably a halogen atom or a hydrogen atom; M is selected from the phosphine ligands of formula PA₃ in which A is a phenyl group or a C₁ to C₄ alkyl group or mixtures thereof; G is selected from a halogen atom or a hydrogen atom; J is selected from a halogen atom or a carboxylate group; K is a carboxylate group and N is triphenylphosphine.

Specific examples of suitable divalent ruthenium catalysts include carbonylchlorohydrido bis (tricyclohexylphosphine) ruthenium (II), carbonylchloro styryl bis(-tricyclohexylphosphine) ruthenium (II), carbonylchlorohydrido bis (tri-isopropylphosphine) ruthenium (II), carbonylchlorostyryl bis(tri-isopropylphoshine) ruthenium (II), carbonylchloro benzoate bis(triphenylphosphine) ruthenium (II), carbonylchlorohydrido tris (triphenylphosphine) ruthenium (II), and dichloro tris (triphenylphosphine) ruthenium (II). Preferred among these carbonylchlorohydrido bis(tricyclohexylphosphine) ruthenium (II) and carbonylchlorostyryl bis(-tricyclohexylphosphine) ruthenium (II).

The concentration of the ruthenium catalyst is not critical and usually is within the range of from about 0.1 to about 2 per cent by weight of the nitrile rubber. For economic reasons it is desirable to minimize the concentration of the ruthenium catalyst and accordingly it is preferably used within the range of from about 0.1 to about 0.25 per cent by weight of the nitrile rubber The improved process of this invention requires the presence, during the hydrogenation, of an inorganic additive selected from ferrous sulphate, ammonium sulphate, ferrous ammonium sulphate, nickel sulphate, cobalt sulphate, ammonium chloride, sulphuric acid, hydrochloric acid and phosphoric acid. The amount of such additive is from about 0.5 to about 1.5 parts by weight per 0.01 parts by weight of ruthenium in the catalyst. When the additive is present at the required concentration in the hydrogenation reaction, the extent of hydrogenation achieved, the time of reaction and the molecular weight of the hydrogenated nitrile rubber (as measured by the Mooney viscosity or the intrinsic viscosity) are all within the desired ranges whereas in the absence of the additive hydrogenation may either not occur or not reach the desired level or take too long or the hydrogenated nitrile rubber will have a significantly increased molecular weight or be crosslinked. Preferred additives include ferrous sulphate and ferrous ammonium sulphate. The molecular weight may be measured as the Mooney viscosity determined at 100° C. (ML 1+4 at 100° C.) or at 125° C. (ML 1+4 at 125° C.) or as the intrinsic viscosity determined at 35° C. in monochlorobenzene.

The following examples illustrate the scope of the invention and are not intended to limit the same.

EXAMPLES

Example 1

A 300 ml glass lined stainless steel autoclave equipped with a temperature control means, an agitator, a catalyst addition means and a sampling means was used. An emulsion of a nitrile rubber containing about 33 weight per cent of nitrile rubber which had about 38 weight per cent acrylonitrile (and correspondingly about 62 weight per cent of butadiene) and which had a Mooney viscosity (ML 1+4 at 100° C.) of about 50 was used. 7 ml of the nitrile rubber emulsion was added to the autoclave, followed by 93 ml of methylethylketone and 0.16 g of ferrous ammonium sulphate. About 0.02 g of the ruthenium catalyst identified in Table 1 was placed in the catalyst addition means, the autoclave was sealed and the mixture was degassed by passing hydrogen through for a short time. Hydrogen was left in the autoclave which was heated up to the desired reaction temperature. When the temperature was reached, the hydrogen pressure was raised to 1200 psi and the catalyst was transferred to the reaction mixture. As necessary, hydrogen was added to the autoclave to maintain the pressure constant. At the end of the reaction, the autoclave was de-pressured and vented and the product recovered, dried and evaluated, the results being shown in Table 1. In Table 1, Catalyst A was dichloro tris(triphenylphosphine) ruthenium (II), Catalyst B was carbonylchlorobenzoato bis(triphenylphosphine) ruthenium (II), Catalyst C was carbonylchlorostyryl bis(-tricyclohexylphosphine) ruthenium (II), Catalyst D was carbonylchlorohydrido tris (triphenylphosphine) ruthenium (II) and Catalyst E was bis-benzoato bis(triphenylphosphine) ruthenium (II). The intrinsic viscosity was measured in chlorobenzene at 35° C. using an Ubbelohde viscometer and the catalyst concentration is shown as parts per million by weight of ruthenium in the catalyst based on the quantity of nitrile rubber. The additive ratio is the weight of the additive, ferrous ammonium sulphate, per 0.01 g of ruthenium in the catalyst. The % hydrogenation was measured by IR spectroscopy. By comparison, in comparable experiments additive over a wide range of reaction conditions can clearly be seen.

Example 3

Using the procedure described in Example 1 and using Catalyst C, a variety of additives were evaluated. In identical experiments, when no additive was used

TABLE 2

|  | EXPT. # | | | | | | |
|---|---|---|---|---|---|---|---|
|  | 1 | 2 | 3 | 4 | 5 | 6 | 7 |
| Wt NBR (g) | 2.33 | 10 | 10 | 10 | 10 | 10 | 6.7 |
| Vol. MEK (ml) | 93 | 100 | 100 | 100 | 100 | 100 | 100 |
| Wt. Add. (g) | 0.16 | 0.2 | 0.2 | 0.2 | 0.2 | 0.2 | 0.14 |
| Ru (ppm) | 1054 | 145 | 368 | 145 | 145 | 145 | 220 |
| Add. Ratio | 0.66 | 1.38 | 0.54 | 1.38 | 1.38 | 1.38 | 0.96 |
| Temp. (C.°) | 130 | 160 | 160 | 180 | 160 | 160 | 180 |
| Press. (psi) | 1200 | 1200 | 1200 | 1200 | 1000 | 800 | 1000 |
| Time (hr) | 0.8 | 6 | 8.5 | 3.5 | 6 | <20 | 2.7 |
| Hydrog. (%) | 99 | 95 | 98 | 97 | 94 | 97 | 99 |
| Int. Visc. (dl/g) | 1.4 | 1.54 | — | — | 1.55 | 1.47 | — | hydrogenation did not occur, and when magnesium sulphate, manganese sulphate, sodium chloride, cuprous chloride and sodium thiosulphate were used either no

TABLE 1

| EXPT. # | CATALYST TYPE | Ru (ppm) | Additive Ratio | Temperature (C.°) | Reaction Time (hours) | Intrinsic viscosity (dl/g) | Hydrogenation (%) |
|---|---|---|---|---|---|---|---|
| 1 | A | 958 | 0.72 | 150 | 4 | 1.45 | 96 |
| 2 | B | 1080 | 0.64 | 150 | 10 | 1.32 | 91 |
| 3 | C | 1054 | 0.66 | 130 | 0.8 | 1.4 | 99 |
| 4 | D | 923 | 0.75 | 150 | 2.8 | 1.34 | 90 |
| 5 | E | 1013 | 0.68 | 150 | 6 | — | 89 | in which no ferrous ammonium sulphate was present (not shown) with Catalysts A and E, the resulting product was crosslinked and with Catalysts B, C, and D, no hydrogenation occurred. The effectiveness of the additive in supporting hydrogenation and in keeping the intrinsic viscosity at an acceptable level without gel formation can clearly be seen.

Example 2

Using the equipment and procedure described in Example 1, further tests were undertaken using only Catalyst C at various reaction conditions and using only ferrous ammonium sulphate as the inorganic compound. The weight of nitrile rubber (Wt NBR) was varied by using different volumes of the nitrile rubber emulsion, the amount of ruthenium (Ru) was varied by altering the amount of Catalyst C added, the reaction time (Time) was as shown and the extent of hydrogenation (Hydrog) was that measured on the polymer recovered after the reaction time shown. The effectiveness of the hydrogenation occurred or the extent of hydrogenation was too low. The experimental conditions are recorded in Table 3 in which Additive I is ferrous ammonium sulphate, Additive II is nickel sulphate, Additive III is ammonium sulphate, Additive IV is ammonium chloride, Additive V is ferrous sulphate and Additive VI is cobalt sulphate. All these additives led to the formation of desirable products.

Example 4

Using Catalyst C and the procedure described in Example 1, sulphuric acid, hydrochloric acid and phosphoric acid were evaluated as additives. The concentration of the sulphuric acid was 18 Molar and the phosphoric acid was 88%. The results are shown in Table 4 in which the additive was sulphuric acid in Experiments 1 and 2, was phosphoric acid in Experiment 3 and was hydrochloric acid in Experiment 4. For Experiments 2 and 3, the reaction temperature was 160° C. for the first five hours and 180° C. for the balance.

TABLE 3

| EXPT. # | 1 | 2 | 3 | 4 | 5 | 6 |
|---|---|---|---|---|---|---|
| Wt NBR (g) | 2.3 | 2.3 | 6.6 | 6.6 | 6.6 | 2.3 |
| Vol. MEK (ml) | 93 | 93 | 100 | 100 | 100 | 93 |
| Wt. Add. (g) | 0.16 | 0.16 | 0.14 | 0.14 | 0.14 | 0.2 |
| Ru (ppm) | 1054 | 1054 | 220 | 220 | 220 | 1054 |
| Additive | I | II | III | IV | V | VI |
| Add. Ratio | 0.66 | 0.66 | 0.96 | 0.96 | 0.96 | 0.82 |
| Temp. (C.°) | 130 | 130 | 180 | 180 | 180 | 160 |
| Press. (psi) | 1200 | 1200 | 1000 | 1000 | 1000 | 1000 |
| Time (hr) | 0.5 | 0.5 | <5 | 3.7 | <2.5 | 2 |
| Hydrog. (%) | 99 | 99 | 98.5 | 97 | 99 | 99 |
| Int. Visc. (dl/g) | 1.4 | 1.77 | 1.67 | 1.78 | 1.64 | 1.75 |

TABLE 4

| | EXPT. # | | | |
|---|---|---|---|---|
| | 1 | 2 | 3 | 4 |
| Wt NBR (g) | 2.3 | 6.6 | 6.6 | 6.6 |
| Vol. MEK (ml) | 93 | 100 | 100 | 100 |
| Vol. Add. (ml) (g) | 0.05 ml | 0.1 ml | 0.13 ml | 0.2 g |
| Ru (ppm) | 1054 | 220 | 220 | 367 |
| Add. Ratio | 0.38 | 1.27 | 1.5 | 0.86 |
| Temp. (C.°) | 160 | 160/180 | 160/180 | 160 |
| Press. (psi) | 1200 | 1000 | 1000 | 1000 |
| Time (hr) | 2.5 | 9 | 10 | 2.5 |
| Hydrog. (%) | 99 | 97.5 | 94 | 99 |
| Int. Visc. (dl/g) | 1.67 | 1.7 | 1.8 | 1.55 |

What is claimed is:

1. An improved process for the production of hydrogenated nitrile rubber wherein a nitrile rubber which is a polymer comprising a conjugated $C_4$–$C_6$ diolefin and a $C_3$–$C_5$ unsaturated nitrile is hydrogenated in the presence of a divalent ruthenium catalyst selected from compounds of the general formula:

RuXY(CO)ZL$_2$ or RuDE(CO)M$_n$, or RuGJM$_3$ or RuK$_2$N$_2$ wherein X is selected from a halogen atom or a carboxylate group, Y is selected from a halogen atom, a hydrogen atom, a phenyl group, a carboxylate group or a styryl group, Z is selected from CO, pyridine, benzonitrile or no ligand and L is selected from the phosphine ligands of the general formula PR$_3$ in which R is selected from alicyclic or alkyl groups, n is 2 or 3 and when n is 3, D is a halogen atom and E is a hydrogen atom and when n is 2, D is selected from a halogen atom or a carboxylate group and E is selected from a halogen atom, a hydrogen atom, a phenyl group or a carboxylate group, and M is selected from the phosphine ligands of the formula PA$_3$ in which A is a phenyl group or a $C_1$ to $C_4$ alkyl group or an alicyclic group, G is selected from a halogen atom or a hydrogen atom, J is selected from a halogen atom or a carboxylate group, K is a carboxylate group and N is triphenylphosphine, the improvement being that said nitrile rubber is provided in an aqueous emulsion, an organic compound which is miscible with the aqueous phase and is also a solvent for the polymer and for the catalyst is added to said aqueous emulsion and an inorganic additive selected from ferrous sulphate, ammonium sulphate, ferrous ammonium sulphate, nickel sulphate, cobalt sulphate, ammonium chloride, sulphuric acid, hydrochloric acid and phosphoric acid is added t the mixture before hydrogenation is initiated, the weight of said additive per 0.01 parts by weight of ruthenium in the catalyst being from about 0.5 to about 1.5.

2. The process of claim 1 wherein the organic compound is selected from acetone, methylethylketone and tetrahydrofuran.

3. The process of claim 1 wherein the amount of said organic compound is from about 30 to about 5 parts by weight per 1 part by weight of nitrile rubber in the emulsion.

4. The process of claim 1 wherein the inorganic additive is selected from ferrous sulphate and ferrous ammonium sulphate.

5. The process of claim 1 wherein the concentration of the ruthenium catalyst is from about 0.i to about 2 per cent by weight of the weight of nitrile rubber.

6. The process of claim 5 wherein the temperature for the hydrogenation is from about 120° C. to about 180° C.

7. The process of claim 1 wherein the hydrogen pressure is from about 25 to about 100 kg/cm$^2$.

8. The process of claim 1 wherein the organic compound is selected from methylethylketone, acetone and tetrahydrofuran, the temperature is from about 120° to about 180° C., the nitrile rubber is a butadiene-acrylonitrile polymer having an acrylonitrile content of from about 15 to about 50 per cent by weight, the amount of said organic compound is from about 15 to about 7 parts by weight per 1 part by weight of nitrile rubber, the inorganic additive is selected from ferrbus sulphate and ferrous ammonium sulphate and the concentration of the ruthenium catalyst is from about 0.1 to about 0.25 per cent by weight of the nitrile rubber.

9. The process of claim 8 wherein the ruthenium catalyst is selected from the group consisting of carbonylchlorohydrido bis(tricyclohexylphosphine) ruthenium (II), carbonylchlorostyryl bis(tricyclohexylphosphine) ruthenium (II), carbonylchlorohydrido bis(tri-isopropylphosphine) ruthenium (II), carbonylchorostyryl bis(tri-isopropylphosphine) ruthenium (II), carbonylchlorobenzoate bis(triphenylphosphine) ruthenium (II), carbonylchlorohydrido tris(triphenylphosphine) ruthenium (II) and dichloro tris(triphenylphosphine) ruthenium (II).

* * * * *